United States Patent
Lazarev

(10) Patent No.: US 10,621,484 B2
(45) Date of Patent: Apr. 14, 2020

(54) CONTACTLESS SMART CARD

(71) Applicant: JOINT-STOCK COMPANY "PAY-RING", Moscow (RU)

(72) Inventor: Sergey Mikhailovich Lazarev, Tomsk (RU)

(73) Assignee: JOINT-STOCK COMPANY "PAY-RING", Moscow (RU)

( * ) Notice: Subject to any disclaimer, the term of this patent is extended or adjusted under 35 U.S.C. 154(b) by 0 days.

(21) Appl. No.: 16/311,951

(22) PCT Filed: Jul. 12, 2017

(86) PCT No.: PCT/RU2017/000517
§ 371 (c)(1),
(2) Date: Dec. 20, 2018

(87) PCT Pub. No.: WO2018/004398
PCT Pub. Date: Jan. 4, 2018

(65) Prior Publication Data
US 2019/0205719 A1    Jul. 4, 2019

(30) Foreign Application Priority Data
Jun. 29, 2016   (RU) ................. 2016126029

(51) Int. Cl.
*G06K 19/06* (2006.01)
*G06K 19/077* (2006.01)
(Continued)

(52) U.S. Cl.
CPC ..... *G06K 19/07749* (2013.01); *G06K 19/067* (2013.01); *G06K 19/077* (2013.01); *H01Q 1/2208* (2013.01); *H04B 5/0025* (2013.01)

(58) Field of Classification Search
CPC .............. G06K 19/067; G06K 19/077; G06K 19/07749; H01Q 1/2208; H04B 5/0025
See application file for complete search history.

(56) References Cited

U.S. PATENT DOCUMENTS

2002/0190125 A1* 12/2002 Stockhammer .... G06K 9/00013
235/382
2006/0267853 A1* 11/2006 Naito ............... G06K 19/07749
343/788
(Continued)

FOREIGN PATENT DOCUMENTS

WO    2015128188 A2    9/2015

OTHER PUBLICATIONS

Written Opinion for PCT Application No. PCT/RU2017/000517 dated Dec. 7, 2017.

*Primary Examiner* — Thien M Le
(74) *Attorney, Agent, or Firm* — Millman IP Inc.

(57) ABSTRACT

This invention is related to structures of contactless smart cards. The essence of this invention is in that it represents a device containing a microchip installed on a substrate, and an antenna, the leads of which are connected to the leads of the microchip, and a capacitor, connected in parallel to the frame antenna and forming together with the latter the antenna of the contactless smart card in the form of a resonance circuit, while the substrate represents a ring, the outer surface of which carries electrically conductive loops, which form the frame antenna and are coated with open-circuit screening foil, which is coated with a protecting coating that forms a hermetically sealed body. The device achieves the required technological result, related to improved service reliability.

2 Claims, 1 Drawing Sheet

(51) Int. Cl.
*G06K 19/067* (2006.01)
*H01Q 1/22* (2006.01)
*H04B 5/00* (2006.01)

(56) References Cited

U.S. PATENT DOCUMENTS

| | | | | |
|---|---|---|---|---|
| 2006/0267854 | A1* | 11/2006 | Naito | H01Q 1/22 343/788 |
| 2010/0052859 | A1* | 3/2010 | Lossau | G06K 19/07749 340/10.1 |
| 2015/0060555 | A1* | 3/2015 | Murayama | G06K 19/07749 235/492 |
| 2016/0196487 | A1* | 7/2016 | Huynh | G06K 19/07762 63/1.11 |
| 2016/0350581 | A1* | 12/2016 | Manuel | G06K 9/00087 |
| 2016/0351514 | A1* | 12/2016 | Ikeda | H01L 21/4853 |
| 2017/0125883 | A1* | 5/2017 | Tenno | H01Q 7/06 |
| 2018/0034319 | A1* | 2/2018 | Robert | H02J 50/10 |
| 2018/0248586 | A1* | 8/2018 | Pachler | H04B 5/0031 |
| 2018/0341847 | A1* | 11/2018 | Finn | G06K 19/07769 |

* cited by examiner

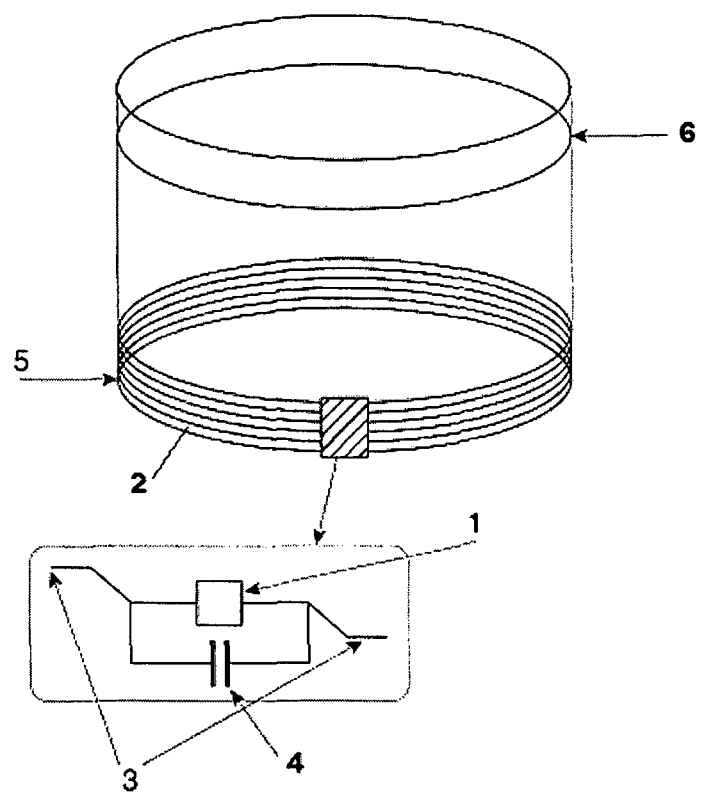

CONTACTLESS SMART CARD

This invention relates to structural components, used for example in wiring circuits on a digital data carrier, used for transferring data, in particular for transferring data to contactless smart cards.

A contactless smart card is equipped with an internal antenna and an electronic module: a microcircuit chip, linked with the antenna. Smart cards provide for data exchange by the means of contactless electromagnetic interaction between the card and the reading device, by passing digital signals between the antenna of the card and the antenna located in the reader.

Contactless smart cards are often used as a means of payment for accessing the transport network; they also can be used as personal identification means.

There is a contactless card or a combined contact-contactless chip-card [RU 22511742, C2, G06K19/077, 10.05.2005], which includes an antenna on the substrate, and the said antenna contains at least one loop, built on the substrate using a screen printing method with electrically conductive paint, and two bodies of the card on each side of the substrate, each of which consists of at least one layer of plastic, a microchip and a module, connected with the antenna, and the substrate is made of paper with a notch on each corner, and the two bodies of the card are soldered to each other at the level of the notches, and the card can delaminate on bending in the area where the bending effort was applied, which makes it possible to detect deliberate damage because the card preserves footprints of bending.

The drawback of this model is its relatively low resistance to external effects.

The nearest technologically to the invented card is the contactless smart card [RU 92558, U1, G06K19/077, 10.03.2010], consisting of a substrate with an antenna made of several loops, and two layers of the card on each side of the substrate, a microchip or a module connected to the antenna, and the antenna contains—additionally—an electrically conductive connection joint, closing some of the antenna loops, and the electrically conductive connection joint is located in the detachable part of the smart card.

The drawback of the nearest technological solution is its relatively low resistance to external effects due to relatively low protection of the device from hazardous factors, which determines its relatively low service reliability.

In particular, the card is not protected from mechanical effects during the course of service because that card needs to be periodically taken out of its storage place and brought into contact with the reader, then returned to its storage place, which exposes the antenna and microchip to mechanical impacts.

Moreover, the model does not provide protection from moisture and aggressive atmosphere, which reduces its protection level.

The present invention aims at producing a device of higher resistance and service reliability under mechanical impacts and aggressive atmosphere, as well as from external electric and magnetic fields.

The technological result of this invention would be ensuring greater service reliability of the device.

This problem is solved and the required technological result is achieved by introducing—in accordance with the invention—into the device, which contains a microchip, located on the substrate, and a frame antenna, the leads of latter connected with those of the microchip, a capacitor, electrically connected in parallel to the frame antenna and, together with the said antenna, making up the antenna of the device in the form of a resonance circuit, while the substrate represents a ring with loops of electrically conductive material carried on its outer surface; the said loops make up the said frame antenna, and they are coated with an open-circuit screening foil, which is coated with a protective coating that forms a hermetically sealed body.

The drawing represents the structure of the contactless smart card.

The contactless smart card contains microchip 1 installed on substrate 2, and frame antenna 3, its leads connected to the leads of microchip 1.

Moreover, the contactless smart card contains capacitor 4, which is connected in parallel to frame antenna 3 and forms with the latter the antenna of the smart card in the form of a resonance circuit, while substrate 2 is made in the form of a ring, the outer surface of which carries loops of electrically conductive material, the said loops forming frame antenna 3, and they are coated with open-circuit, screening foil 5, which is coated with protective coating 6 that forms a hermetically sealed body.

The contactless smart card is constructed in the following fashion.

The contactless smart card, which incorporates a chip with near-field communication (NFC) technology, is most often made in the form of a ring. The diameter of the ring may correspond to the diameter of a piece of jewelry worn around a finger or a bracelet worn around the wrist. Protective coating 6, which can be made of plastic, ceramic, a composite material etc., represents the body of the device, which can be hermetically sealed, ensuring protection from moisture, dust and other negative effects. The body of the device can be used as a piece of jewelry in the form of a ring worn around a finger, ensuring reliable, hermetically sealed storage of electronic components of the device.

Microchip 1 provides interaction with the reader, transferring coded data by radio signals. Frame antenna 3, the loops of which are coated with open-circuit screening foil 5, form together with condenser 4 a resonance circuit, which represents the antenna of the contactless smart cards. Screening foil 5 coats frame antenna 3 made in the form of electrically conductive loops with a gap between them, so that foil 5 itself would not form a closed surface.

Screening foil 5 protects from external electric and magnetic fields. It also decreases to a certain extent quality factor of the resonance circuit, which broadens the transmission band.

Consequently, the new invention achieves the required technological result: improvement of service reliability of the device.

In particular, the device features protection from mechanical impacts in the course of service because microchip 1 is placed inside a reliable body, which practically excludes mechanical impacts. Because the body is hermetically sealed, it protects the device from moisture and aggressive atmosphere. Protection of the device from external electric and magnetic fields has been improved significantly, increasing its sensitivity, and also the transmission band of working frequencies of the antenna has been broadened.

The device can be firmly attached to its owner's body, without having to use additional accessories, and wearing this device does not require the owner's continuous attention, which expands the scope of its application (it could be used on the beach for example) and decreases the risk of its going amiss.

The special feature of this device is its small size in comparison with known smart cards, its level of protection from aggressive atmosphere and possibility to attach it firmly to owner's body.

The invention claimed is:

1. A contactless smart card, comprising:
    a substrate having an annular form;
    a microchip installed on the substrate;
    a frame antenna having electrically conductive loops positioned on an outer surface of the annular form of the substrate, the frame antenna having leads connected to the microchip;
    a capacitor connected to the leads of the frame antenna in parallel to the microchip and forming a resonance circuit with the antenna;
    an open-circuit screening foil positioned atop of the frame antenna; and
    a protective coating positioned on the open-circuit screening foil to form a hermetically sealed body.
2. A contactless smart card according to claim 1, wherein each of the electrically conductive loops extends from the microchip and around the circumference of the annular form of the substrate.

* * * * *